United States Patent
Liu et al.

(10) Patent No.: US 11,243,932 B2
(45) Date of Patent: Feb. 8, 2022

(54) METHOD, DEVICE, AND COMPUTER PROGRAM PRODUCT FOR MANAGING INDEX IN STORAGE SYSTEM

(71) Applicant: EMC IP Holding Company LLC, Hopkinton, MA (US)

(72) Inventors: Jie Liu, Chengdu (CN); Haitao Li, Chengdu (CN); Jian Wen, Chengdu (CN); Chao Lin, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/917,843

(22) Filed: Jun. 30, 2020

(65) Prior Publication Data
US 2021/0303538 A1    Sep. 30, 2021

(30) Foreign Application Priority Data
Mar. 27, 2020 (CN) .......................... 202010231101.5

(51) Int. Cl.
*G06F 16/22* (2019.01)
*G06F 16/13* (2019.01)

(52) U.S. Cl.
CPC ........ *G06F 16/2272* (2019.01); *G06F 16/137* (2019.01)

(58) Field of Classification Search
CPC .......................... G06F 16/2272; G06F 16/137
See application file for complete search history.

(56) References Cited

U.S. PATENT DOCUMENTS

| 6,625,591 | B1 * | 9/2003 | Vahalia | G06F 16/9014 |
| 8,484,505 | B1 * | 7/2013 | Dutch | G06F 11/1451 |
| | | | | 714/6.1 |
| 9,195,549 | B1 * | 11/2015 | Dutch | G06F 16/1748 |
| 10,545,914 | B2 * | 1/2020 | Surcouf | G06F 16/164 |
| 2013/0227236 | A1 * | 8/2013 | Flynn | G06F 3/061 |
| | | | | 711/165 |
| 2020/0167312 | A1 * | 5/2020 | Katai | G06F 16/2255 |

* cited by examiner

*Primary Examiner* — Eliyah S. Harper
(74) *Attorney, Agent, or Firm* — Chamberlain, Hrdlicka, White, Williams & Aughtry

(57) ABSTRACT

The present disclosure relates to a method, a device, and a computer program product for managing indexes in a storage system. The storage system includes storage data. In the method, a first set of data objects associated with the storage data is acquired. A first set of hashes of the first set of data objects is determined respectively. Hashes in the first set of hashes are hashes of data objects in the first set of data objects. A first file is generated in the storage system to store the first set of hashes. A first name of the first file is determined based on the hashes in the first set of hashes. An index of the storage data is created based on the first file.

17 Claims, 9 Drawing Sheets

| Hash | Path identifier |
|---|---|
| 192E...782C | 1298 |
| ... | ... |
| EDCC...23BB | 35275 |
| ... | ... |

FIG. 8

METHOD, DEVICE, AND COMPUTER PROGRAM PRODUCT FOR MANAGING INDEX IN STORAGE SYSTEM

CROSS-REFERENCE TO RELATED APPLICATIONS

The application claims priority to Chinese Patent Application No. 20201023110.5 filed on Mar. 27, 2020. Chinese Patent Application No. 20201023110.5 is hereby incorporated by reference in its entirety.

TECHNICAL FIELD

Various implementations of the present disclosure relate to storage management, and more particularly, to a method, a device, and a computer program product for managing indexes in a storage system.

BACKGROUND

With the development of data storage technologies, a variety of data storage devices have been able to provide users with increasingly high data storage capacities, and the speed of data access has also been greatly improved. While data storage capacities are improved, demands of users for the response time of a storage system are also increasingly high. At present, a technical solution of establishing an index for storage data in a storage system has been proposed. However, establishment and maintenance of indexes will result in additional overhead of computing resources and storage resources. Therefore, it is desirable to manage indexes in a storage system in a more efficient way.

SUMMARY OF THE INVENTION

Therefore, it is desirable to develop and implement a technical solution of managing indexes in a more efficient way. It is desirable that the technical solution is compatible with existing storage systems, and by modifying various configurations of the existing storage systems, indexes of a storage system may be managed in a more effective way.

According to a first aspect of the present disclosure, a method for managing indexes in a storage system is provided. The storage system includes storage data. In the method, a first set of data objects associated with the storage data is acquired. A first set of hashes of the first set of data objects is determined respectively. Hashes in the first set of hashes are hashes of data objects in the first set of data objects. A first file is generated in the storage system to store the first set of hashes. A first name of the first file is determined based on the hashes in the first set of hashes. An index of the storage data is created based on the first file.

According to a second aspect of the present disclosure, an electronic device is provided. The electronic device includes: at least one processor; and a memory coupled to the at least one processor. The memory has instructions stored therein. When executed by the at least one processor, the instructions cause the device to execute actions for managing indexes in a storage system. The storage system includes storage data. The actions include: acquiring a first set of data objects associated with the storage data; determining a first set of hashes of the first set of data objects respectively, hashes in the first set of hashes being hashes of data objects in the first set of data objects; generating a first file in the storage system to store the first set of hashes, a first name of the first file being determined based on the hashes in the first set of hashes; and creating an index of the storage data based on the first file.

According to a third aspect of the present disclosure, a computer program product is provided. The computer program product is tangibly stored on a non-transitory computer-readable medium and includes machine-executable instructions, the machine-executable instructions being used for performing the method according to the first aspect of the present disclosure.

BRIEF DESCRIPTION OF THE DRAWINGS

The features, advantages, and other aspects of various implementations of the present disclosure will become more apparent in conjunction with the accompanying drawings and with reference to the following detailed description. Several implementations of the present disclosure are shown here by way of example but not limitation. In the accompanying drawings:

FIG. 8 schematically illustrates a block diagram of a mapping relationship between hashes of related files of storage data and storage paths according to an example implementation of the present disclosure.

DETAILED DESCRIPTION

Preferred implementations of the present disclosure will be described in more detail below with reference to the accompanying drawings. Although preferred implementations of the present disclosure are illustrated in the accompanying drawings, it should be understood that the present disclosure may be implemented in various forms and should not be limited by the implementations illustrated herein. Rather, these implementations are provided to make the present disclosure more thorough and complete, and will fully convey the scope of the present disclosure to those skilled in the art.

The term "include" and its variants as used herein mean open inclusion, i.e., "including, but not limited to." Unless specifically stated, the term "or" means "and/or." The term "based on" means "based at least in part on." The terms "one example implementation" and "one implementation" mean "at least one example implementation." The term "another implementation" means "at least one additional implementation." The terms "first," "second," etc. may refer to different or identical objects. Other explicit and implicit definitions may be included below.

Figure 1:
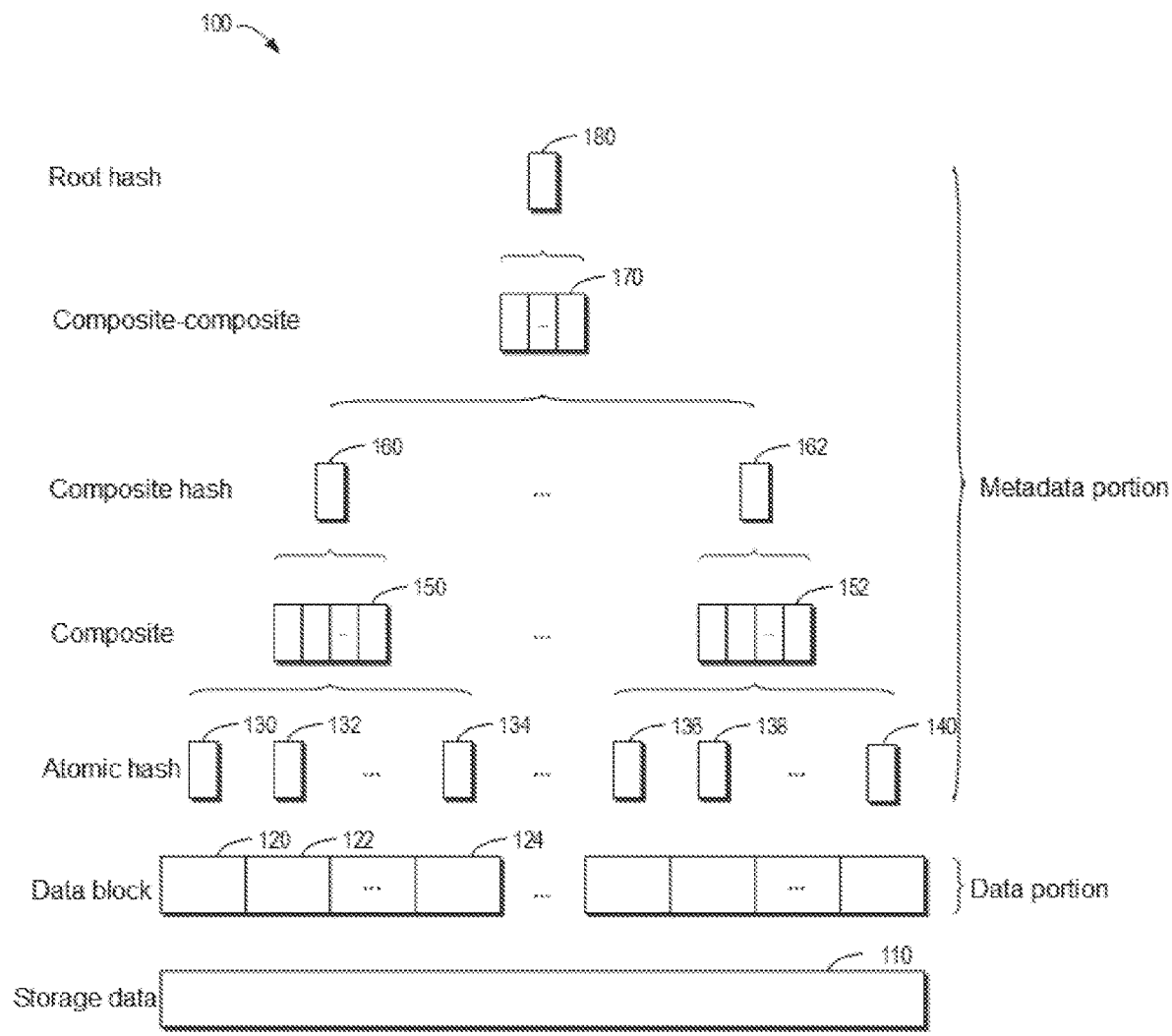
FIG. 1 schematically illustrates a block diagram of an index of storage data according to a technical solution.

An application environment of an example implementation of the present disclosure will be first described with reference to FIG. 1. FIG. 1 schematically illustrates block diagram 100 of an index of storage data according to a technical solution. In FIG. 1, storage data 110 is data to be stored in a storage system. The data may be of multiple formats. For example, the data may be of formats such as video, audio, and text, or may also be database files. When storage data 110 (for example, a high-definition movie) is large, storage data 110 needs to be divided into multiple data blocks (also called atomic blocks). At this moment, the multiple data blocks will be stored as data portions in the storage system.

At present, a technical solution of establishing an index for storage data 110 has been proposed. For example, metadata of storage data 110 may be acquired based on the following manner. A set of hashes 130, 132, . . . , and 134 may be acquired for a set of data blocks 120, 122, . . . , and 124 (having a predetermined number), respectively. The set of hashes 130, 132, . . . , and 134 may be combined to obtain composite 150, and composite hash 160 of composite 150 is acquired. Similarly, another set of hashes 136, 138, . . . , and 140 of another set of data blocks may be acquired, and then corresponding composite 152 and corresponding composite hashes 162 are obtained. Then, multiple composite hashes 160, . . . , and 162 may be combined to form composite-composite 170, and root hash 180 is acquired finally. In this way, the above metadata may be used as index nodes at various hierarchies in an index.

The index nodes in the index may be stored in a dedicated index area of the storage system. The index nodes are stored in a continuous way, and pointers are used to represent reference relationships between the index nodes at various hierarchies. During the operation of the storage system, a large quantity of computing resources and storage resources are needed to maintain the index. When one or more atomic blocks in storage data 110 are deleted, the content of the index needs to be updated, which will cause holes in the index. When a large amount of storage data exists in the storage system, creating and maintaining indexes will cause heavy computing overheads and storage overheads to the storage system. Therefore, it is desirable to manage indexes in a more efficient way.

In order to at least partially solve the above problem and one or more of other potential problems, an example implementation of the present disclosure proposes a method of managing indexes. According to an example implementation of the present disclosure, hashes are stored in a file form. Hereinafter, an overview of an example implementation of the present disclosure will be first described with reference to FIG. 2.

Figure 2:
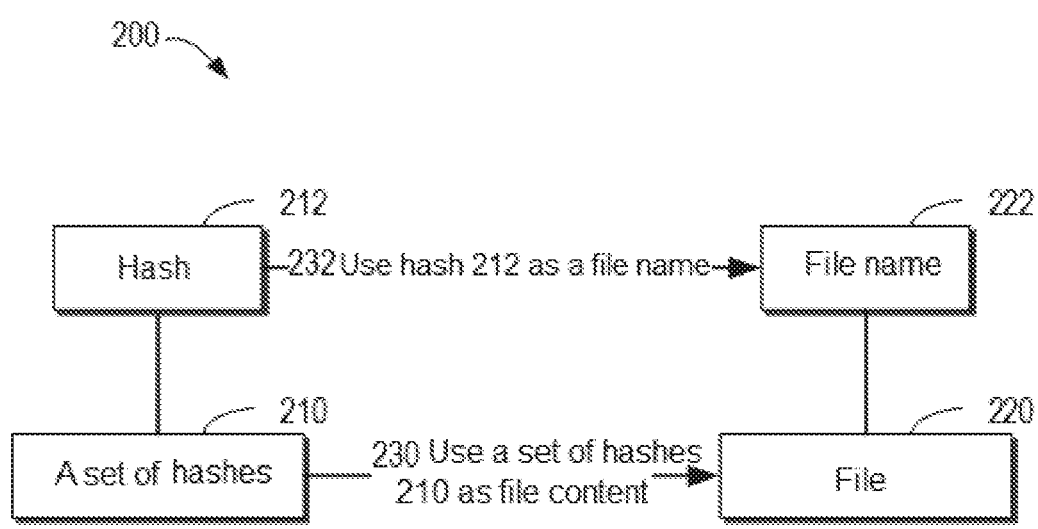
FIG. 2 schematically illustrates a block diagram of a process for generating a node in an index of storage data according to an example implementation of the present disclosure.

FIG. 2 schematically illustrates block diagram 200 of a process for generating a node in an index of storage data according to an example implementation of the present disclosure. As shown in FIG. 2, a set of hashes 210 is hashes of a set of data objects in the storage data. Hash 212 in the set of hashes 210 may be determined according to a predetermined algorithm (for example, SHA-1 algorithm or other algorithms). The set of hashes 210 may be stored (as indicated by arrow 230) in file 220, and at this moment, file name 222 of file 220 is set (as indicated by arrow 232) to hash 212.

In this way, a hierarchical relationship between a lower-hierarchy set of hashes 210 and upper-hierarchy hash 212 may be conveniently recorded. Each hash in the lower-hierarchy set of hashes 210 may be obtained only by reading file content of file 220. Compared with the existing solution in which a pointer is used to point to an address of a storage space where lower-hierarchy hashes are located, a hierarchical relationship is recorded using a file name and the file content, so that storage overheads and management overheads may be reduced, and existing functions of a file system may be directly used to manage file 220.

Figure 3:
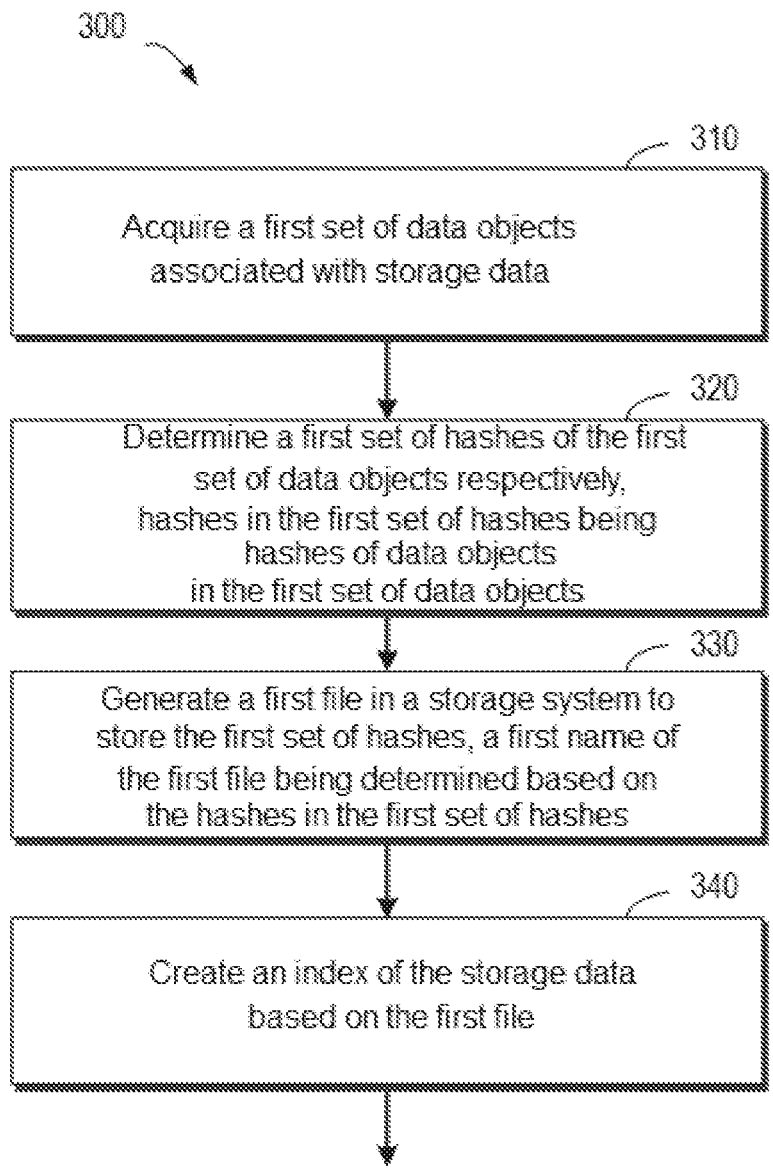
FIG. 3 schematically shows a flowchart of a method for managing indexes in a storage system according to an example implementation of the present disclosure.

Hereinafter, more details of a schematic implementation of the present disclosure will be described with reference to FIG. 3. FIG. 3 schematically shows a flowchart of method 300 for managing indexes in a storage system according to an example implementation of the present disclosure. The figure schematically illustrates a process of establishing an index for storage data included in a storage system. At block 310, a first set of data objects associated with the storage data is acquired. The storage data may include multiple data blocks. At least a portion of the multiple data blocks may be acquired as the first set of data objects. Hereinafter, more details of method 300 will be described in detail with reference to FIG. 4.

Figure 4:
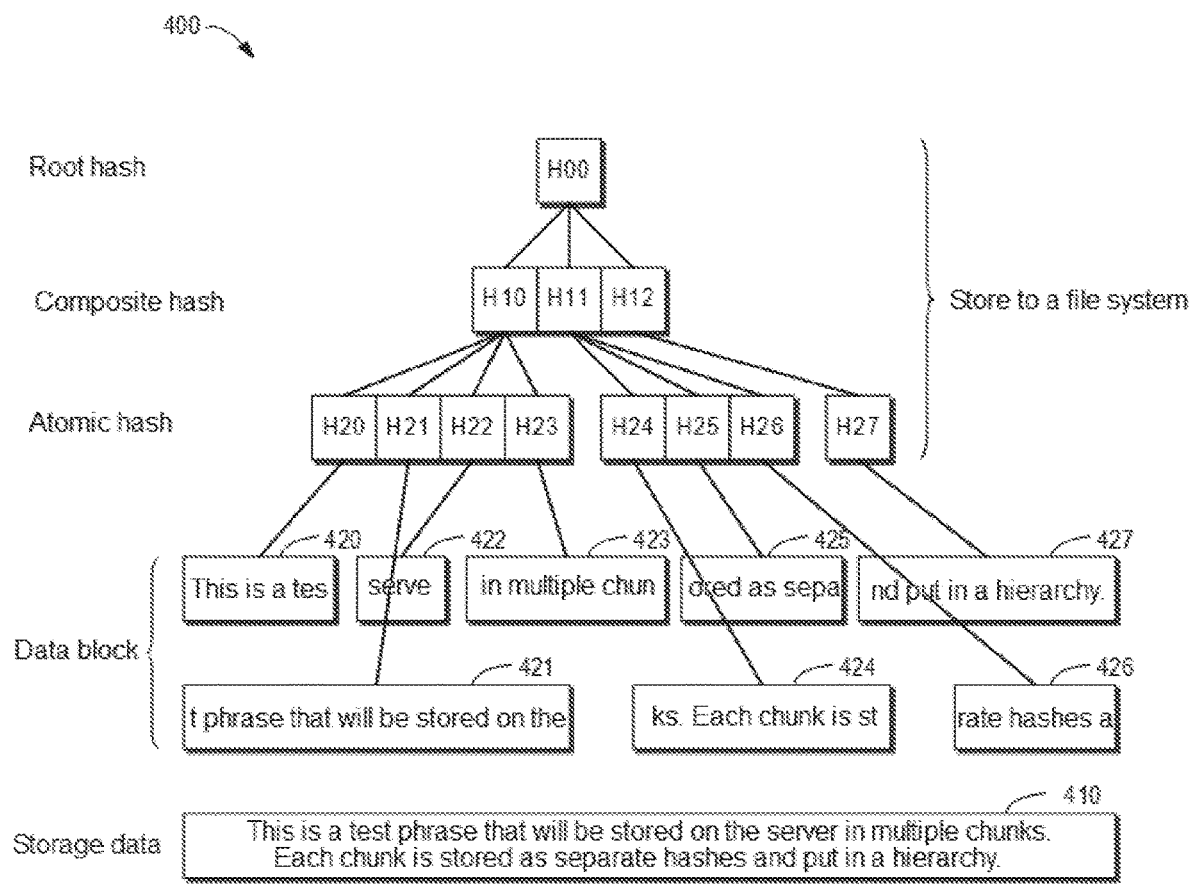
FIG. 4 schematically illustrates a block diagram of a process for generating an index of storage data according to an example implementation of the present disclosure.

FIG. 4 schematically illustrates block diagram 400 of a process for generating an index of storage data according to an example implementation of the present disclosure. Hereinafter, for convenience, only a text file is described as an example of storage data. It is assumed that storage data 410 includes the following text: "This is a test phrase that will be stored on the server in multiple chunks. Each chunk is stored as separate hashes and put in a hierarchy." Storage data 410 may be divided into multiple data blocks 420 to 427. A portion of the data blocks may be used as a first set of data objects. It will be understood that although FIG. 4 schematically illustrates data blocks 420, 421, 422, and 423 as the first set of blocks, according to an example implementation of the present disclosure, a set of data blocks may also include other numbers of data blocks.

Returning to block 320 of FIG. 3, a first set of hashes of the first set of data objects is determined respectively. At this moment, one hash is generated based on each of the first set of data objects. Still referring to FIG. 4, hash H20 may be generated based on data block 420. In this step, a hash may be generated, for example, based on an SHA-1 algorithm. Specifically, text "This is a tes" in data block 420 may be used as an input, and a corresponding hash is obtained. Based on different algorithms, the hash may have different lengths. According to an example implementation of the present disclosure, each hash has a fixed length of, for example, 20 bytes. Similarly, hash H21 may be generated based on data block 421, hash H22 may be generated based on data block 422, and hash H23 may be generated based on data block 423. At this moment, the lengths of the obtained hashes H20 to H23 are all 20 bytes.

Returning to block 330 of FIG. 3, a first file is generated in the storage system to store the first set of hashes. At this moment, a first name of the first file is determined based on the hashes in the first set of hashes. It will be understood that since files are used to store hashes, a type may be set for the files, so as to distinguish them from files for storing data blocks. According to an example implementation of the present disclosure, the type of a first file may be set to "index type," and a file for storing an ordinary data block may be set to "data type." With the example implementation of the present disclosure, in the file system, it is easy to distinguish whether data content or index content is stored in a file, thus facilitating management.

Figure 5:
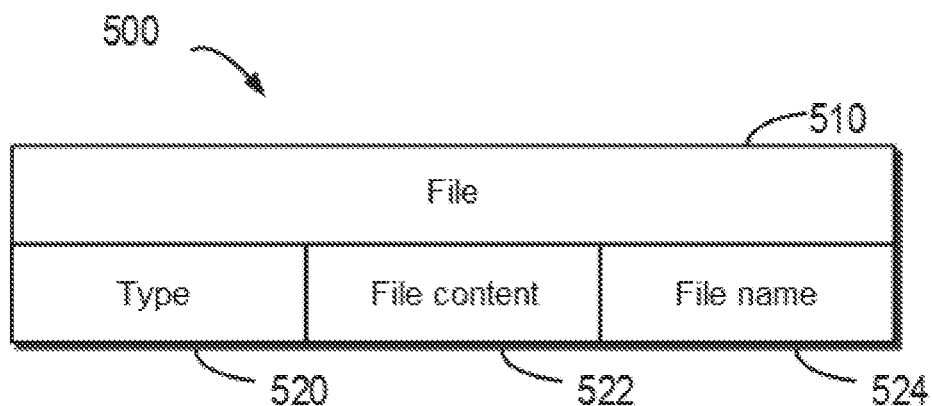
FIG. 5 schematically illustrates a block diagram of a data structure of a file representing a node in an index according to an example implementation of the present disclosure.

FIG. 5 schematically illustrates block diagram 500 of a data structure of a file representing a node in an index according to an example implementation of the present disclosure. As shown in FIG. 5, file 510 may include: type mark 520 configured to indicate whether the file is of an "index type" or a "data type" (for example, it may be expressed with 2 bytes); file content 522 configured to store a data body of the file; and file name 524 configured to store the name of the file.

According to an example implementation of the present disclosure, type 520, file content 522, and file name 524 may be determined respectively to generate a file. First, type 520 may be determined based on a type of the data to be stored in the file. For ordinary data blocks, type 520 may be set to "data type." For hashes, type 520 may be set to "index type." File content 522 and file name 524 of a file of the "data type" may be generated based on existing methods. How to generate file content 522 and file name 524 of a file of the "index type" will be described below.

A first set of hashes may be combined according to a predetermined combination rule to generate content of a first file. Still referring to FIG. 4, hashes H20, H21, H22, and H23 may be combined to obtain the first file's content. Assuming that the length of each hash is 20 bytes and that a type is represented with 2 bytes, then the length of related data of a hash is 22 bytes. By connecting related data of the above four hashes in series, the length of the obtained content of the first file is 22*4=88 bytes. Then, the obtained 88 bytes (i.e., the first file's content) may be stored into the first file. The above 88-byte file content may be used as an input to a hash algorithm to obtain hash H10 of the first file's content. At this moment, a hash represented with 20 bytes may be obtained, and it may be set as a first name of the first file.

The above has described how to acquire a node at a hierarchy in the index. Returning to block 340 of FIG. 3, an index of the storage data may be created based on the first file. Other nodes in the index may be acquired in a similar way. According to an example implementation of the present disclosure, a second set of data objects associated with the storage data may be acquired, a second set of hashes of the second set of data objects is determined respectively, and a second file is generated in the storage system to store the second set of hashes. At this moment, a second name of the second file is determined based on the hashes in the second set of hashes.

Still referring to FIG. 4, data blocks 424, 425, and 426 may be used as the second set of data objects, and hashes H24, H25, and H26 of the data blocks may be respectively acquired based on the method described above. At this moment, the length of each hash is 20 bytes, and the type is represented with 2 bytes. The obtained hash-related data may be combined to obtain a second set of hashes (represented with 22*3=66 bytes), and hash H11 in the second set of hashes is used as a second file name. It will be understood that, although the above shows that the second set of data objects includes three data objects, the first set of data objects and the second set of data objects may have the same quantity or different quantities.

According to an example implementation of the present disclosure, an unprocessed set of data blocks may be continuously selected from multiple data blocks of storage data 410, and the operations of method 300 above may be performed until all of the data blocks are processed. In the case where the first set of data blocks and the second set of data blocks have been processed, there is still data block 427 that has not been processed. An operation performed on this block will be described below with reference to FIG. 6.

Figure 6:
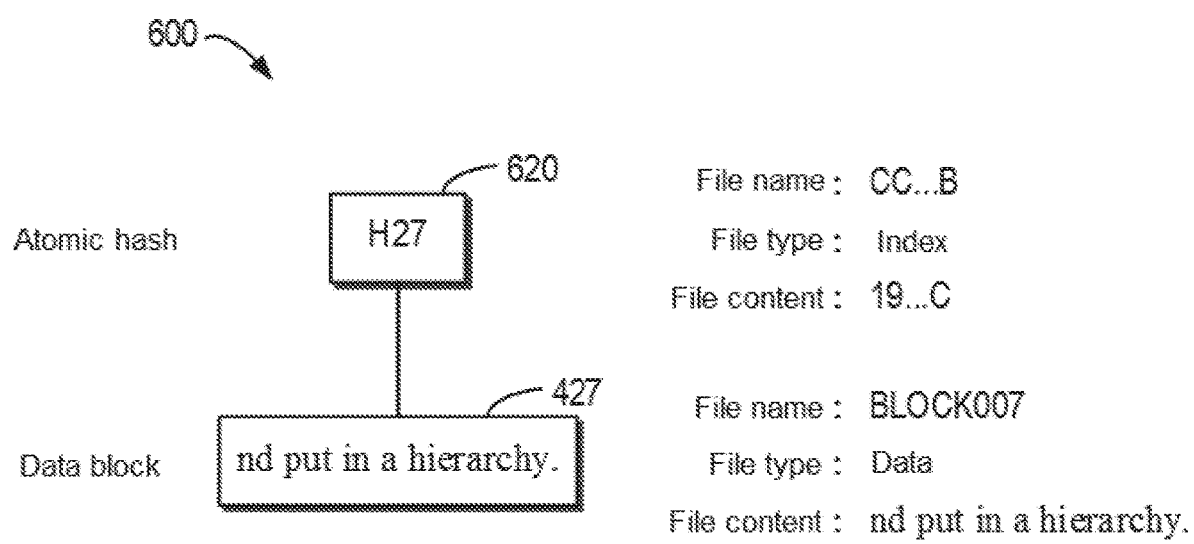
FIG. 6 schematically illustrates a block diagram of a process for generating a file according to an example implementation of the present disclosure.

FIG. 6 schematically illustrates block diagram 600 of a process for generating a file according to an example implementation of the present disclosure. Text "nd put in a hierarchy." in data block 427 may be taken as an input to a hash algorithm, and hash H27 is obtained. Further, hash H12 of hash H27 may be acquired as a file name (for example, represented by 20-byte data "cc . . . b"). At this moment, a type of the generated file is index type, and the file content is the value of hash H27 (for example, represented by 20-byte data "19 . . . c"). For lower-hierarchy ordinary data block 427, the name of a file corresponding to the data block may be represented as "block007," the file type is "data type," and the file content is the text "nd put in a hierarchy." In this way, processing on all of data blocks 420 to 427 in storage data 410 may be completed.

According to an example implementation of the present disclosure, nodes at an upper hierarchy in the index may be generated in a hierarchical way. According to an example implementation of the present disclosure, a third file is generated in the storage system to store hashes of the first name and the second name. Then, the third file is identified as a parent node of the first file and the second file in the index. In this way, a hierarchical relationship between the index nodes in the index may be recorded. The above has described the process of generating hash H10 based on a first set of hashes H20, H21, H22, and H23, the process of generating hash H11 based on a second set of hashes H24, H24, and H26, and the process of generating hash H12 based on a third set of hashes (including only hash H27). Hereinafter, how to generate parent node H00 at an upper hierarchy based on hashes H10, H11, and H12 will be described.

According to an example implementation of the present disclosure, the first name and the second name may be combined according to a predetermined combination rule to generate content of a third file. The third file's content may be stored into the third file, and a hash of the third file's content may be used as a name of the third file. It will be understood that although only an example of generating an upper-hierarchy index node based on two names (namely, a first name and a second name) is schematically illustrated here, an upper-hierarchy node may also be generated based on more names according to an example implementation of the present disclosure.

Returning to FIG. 4, the figure illustrates the process of generating a related file of a root hash based on three file names. H10, H11, and H12 are represented with 20 bytes respectively, and the type of each file is represented with 2 bytes. Related data of hashes H10, H11, and H12 may be connected in series to obtain file content represented with 22*3=66 bytes. The file content may be stored to a file, and the above 66 bytes may be used as an input to a hash algorithm to acquire hash H00. Hash H00 may be used as a name of a file representing a parent node. In this way, root node file H00 of the index may be obtained. It will be understood that although the above shows an index including three hierarchies, the index may also include more or fewer hierarchies according to an example implementation of the present disclosure.

According to an example implementation of the present disclosure, the third file may be identified as the first file to perform method 300 iteratively until the third file involves all data blocks in the storage data. At this moment, the third file may be identified as a root file of the index of the storage data. Still referring to FIG. 4, assuming that storage data 410 includes a large number of data blocks and a large number of hashes are generated, these hashes may be grouped based on the method described above, and hashes in each set of hashes may be generated. Corresponding multiple composite hashes may be generated, and further, the multiple composite hashes may be grouped, and respective hashes are generated for each set. In this way, an index having more hierarchies may be generated.

The above has described how to generate an index of storage data. According to an example implementation of the present disclosure, existing functions of a file system may be used to manage related files of nodes in the index. In this way, additional overheads as a result of storing the index in the existing way may be avoided. For example, with the example implementation of the present disclosure, it is not necessary to check whether each index entry points to a correct storage location, it is not necessary to check the consistency between hashes of data blocks and related data in the index, and it is not necessary to check a reference relationship between hashes at all hierarchies. When deleting a storage object, a corresponding file in the index may be deleted directly based on a function provided by the file system, and there will be no holes in an index space.

In the case where an index of storage data has been generated, the index may be used to access the storage data. According to an example implementation of the present disclosure, based on the hierarchical relationship recorded between the file name and file content of each file in the index, lower-hierarchy files may be accessed level by level until all data blocks in storage data 410 are acquired. File content of the root file may be read if an access request for accessing the storage data is received. Still referring to FIG. 4, root file H00 may be read. According to an example implementation of the present disclosure, subsequent operations may be determined based on the type of a given file.

If it is determined that the type of a given file is index type, a lower-hierarchy node of the index may be accessed based on a lower-hierarchy set of child file names of the given file. A set of file names of a set of child nodes of the root file may be determined respectively based on a predetermined combination rule. Specifically, the file content of the root file includes 22*3=66 bytes, in which file names and file types of three files are included. Therefore, by parsing the file content of the root file in order, names H10, H11, and H12 of three lower-hierarchy files may be obtained, respectively. At this moment, types of the three files are all "index type." Further, all files may be processed one by one according to file names and types. For file H10, the type of the file is "index type," and four files H20, H21, H22, and H23 at a lower level may be acquired respectively by reading file content of the file. At this moment, types of the above four files are all "index type."

According to an example implementation of the present disclosure, if a type of the given file is determined as data type, file content of the given file may be accessed. At this moment, the file content includes one of the multiple data blocks of the storage data. Further, all files may be processed one by one. For file H20, file content of the file may be read, so as to find a lower-hierarchy file (file corresponding to data block 420). Since a file type of the file is "data type," at this moment, content of data block 420, that is, the text "This is a tes," may be read from the file. Similarly, text in other data blocks 421, 422, and 423 may be obtained by reading lower-hierarchy files of files H21, H22, and H23, respectively.

According to an example implementation of the present disclosure, all child nodes of the root file may be traversed according to the method described above to access all of the data blocks of the storage data. Specifically, text in data blocks 420, 421, 422, and 423 may be obtained by accessing a lower-hierarchy file of file H10. Text in data blocks 424, 425, and 425 may be obtained by accessing a lower-hierarchy file of file H11. Text in data block 427 may be obtained by accessing a lower-hierarchy file of file H12. In this way, text in all of data blocks 420 to 427 in storage data 410 may be obtained. By combining the above multiple pieces of text, all text of storage data 420 may be obtained. With the example implementation of the present disclosure, related data at each hierarchy in the index may be acquired based on a relationship between files in the index and file names, and thus, storage data 410 may be obtained in a simpler and more efficient way.

It will be understood that the above describes by way of example only a case where there is no duplicated data among multiple data blocks 420 to 427 in storage device 410. According to an example implementation of the present disclosure, duplicated data may also exist between multiple data blocks, and duplicated data may also be stored between data blocks in two versions of storage data during a backup process. At this moment, duplicated data blocks may be first removed based on a data de-dupe technology, and then method 300 described above is performed.

Figure 7:
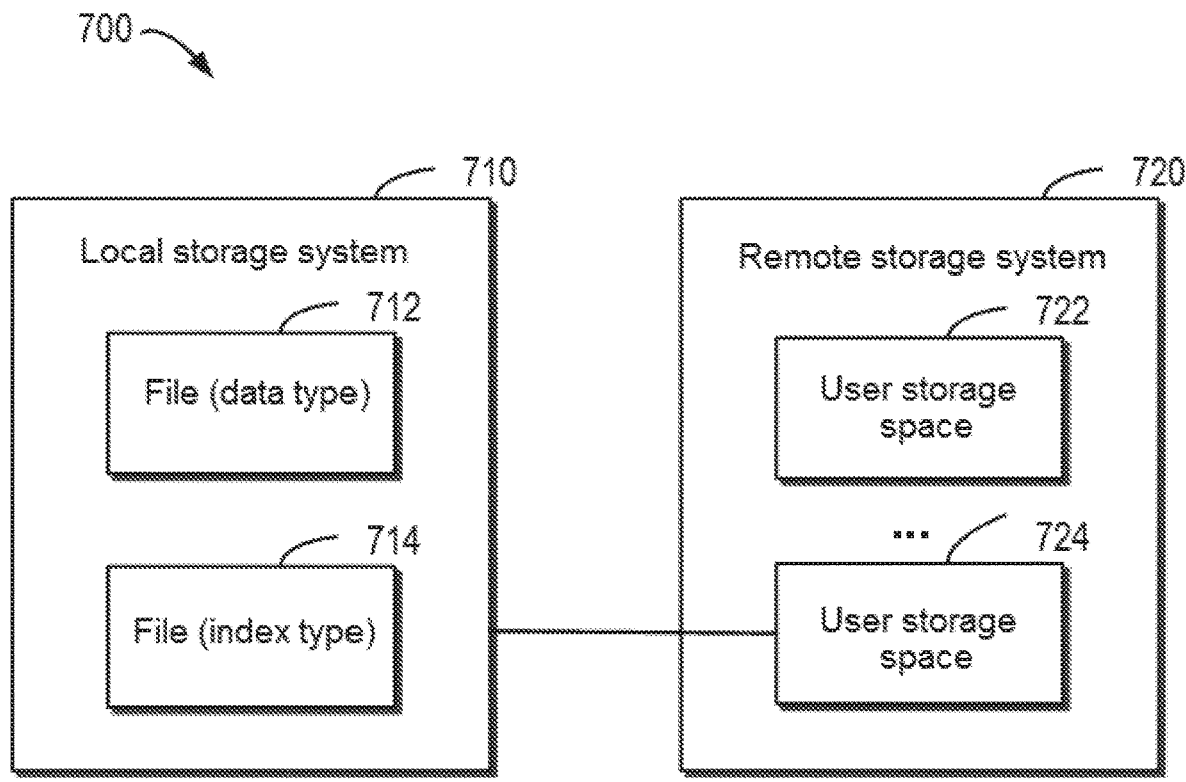
FIG. 7 schematically illustrates a block diagram of transmitting a related file of storage data to a remote storage system according to an example implementation of the present disclosure.

According to an example implementation of the present disclosure, in order to improve data security, backup may also be made to a remote storage system. FIG. 7 schematically illustrates block diagram 700 of transmitting a related file of storage data to a remote storage system according to an example implementation of the present disclosure. As shown in the figure, in local storage system 710, a storage file may be divided into multiple data blocks, and each data block may be respectively stored in file 712 of a data type. An index may be established based on the method described above, and multiple nodes related to the index may be stored in multiple files 714 of an index type, respectively. At this moment, the functions of a file system of local storage system 710 may be used to create, delete, and update files 712 and 714.

With the development of network storage systems, a large number of remote storage systems have appeared at present. Remote storage system 720 (for example, a cloud-based storage system) may allocate a storage space for each user, for example, user storage spaces 722, . . . , and 724. In order to improve the security and reliability of local storage system 710, related files of storage data may be transmitted to remote storage system 720. For example, file 714 of the index type may be transmitted to user storage space 724.

Generally speaking, there is a limit to the size of a user storage space (for example, 5 TB). As the amount of data in local storage system 710 increases, the amount of data expected to be uploaded increases accordingly and may exceed the limit to the user storage space. According to an example implementation of the present disclosure, a correspondence relationship between storage paths and user storage spaces may be established.

According to an example implementation of the present disclosure, a related storage path may be determined based on hashes. FIG. 8 schematically illustrates block diagram 800 of a mapping relationship between hashes of related files of storage data and storage paths according to an example implementation of the present disclosure. Based on a file related to the storage data, a path identifier associated with the file may be determined. For example, assuming that a hash of a file is "192e . . . 732c," a portion of characters in the hash may be used to create a path identifier, such as "1298" shown in entry 810 in FIG. 8. In local storage system 710, a folder "1298" may be created, and the file may be identified using a path "/1298/192e . . . 732c."

According to an example implementation of the present disclosure, a correspondence relationship may be established between path identifiers in local storage system 710 and user storage spaces in remote storage system 720, so as to store files into the user storage spaces having the path identifiers in remote storage system 720. Specifically, in remote storage system 720, a user storage space having an identifier of "1298" may be established, and files may be transmitted to the user storage space. With the example implementation of the present disclosure, files in one directory may be transmitted to a corresponding user storage space, and the corresponding user storage space may be found based on a path identifier. In this way, multiple user storage spaces in remote storage system 720 may be used, thereby avoiding a situation where one user storage space is insufficient to accommodate all files.

According to an example implementation of the present disclosure, a file may be retrieved from a storage space having a path identifier in the remote storage system. For example, a file with a hash of "192e . . . 732c" may be retrieved from a user storage space with an identifier of "1298." According to an example implementation of the present disclosure, a predetermined format may be set for the identifier. For example, the identifier may be represented with 4 digits. As the number of files in local storage system 710 increases, if 4 digits are not enough to represent the identifier, the number of digits of the identifier may also be extended. As shown in entry 820 in FIG. 8, when the identifier is extended to 5 digits, assuming that a file's hash is "edcc . . . 23bb," "35275" shown in entry 820 in FIG. 8 may be used as the identifier.

According to an example implementation of the present disclosure, after the number of digits of an identifier is extended, the identifier of the user storage space may be updated based on the extended format. If the format of the identifier is the format before extension, the identifier may also be updated. For example, when searching for the user storage space having the identifier "1298" in remote storage system 720, the first bit of the identifier may be zeroized. At this moment, based on the identifier "01298," the corresponding user storage space having the identifier "01298" may be found. With the example implementation of the present disclosure, the format of the identifier may be continuously extended to meet the demand for increasing a storage capacity in local storage system 710.

Examples of the method according to the present disclosure have been described in detail above with reference to FIGS. 2 to 8, and implementations of a corresponding apparatus will be described below. According to an example implementation of the present disclosure, an apparatus for managing indexes in a storage system is provided. The storage system includes storage data. The apparatus includes: an acquiring module configured to acquire a first set of data objects associated with the storage data; a determining module configured to determine a first set of hashes of the first set of data objects respectively, hashes in the first set of hashes being hashes of data objects in the first set of data objects; a generating module configured to generate a first file in the storage system to store the first set of hashes, a first name of the first file being determined based on the hashes in the first set of hashes; and a creating module configured to create an index of the storage data based on the first file. According to an example implementation of the present disclosure, the apparatus may further include corresponding modules for performing respective steps of method 300.

Figure 9:
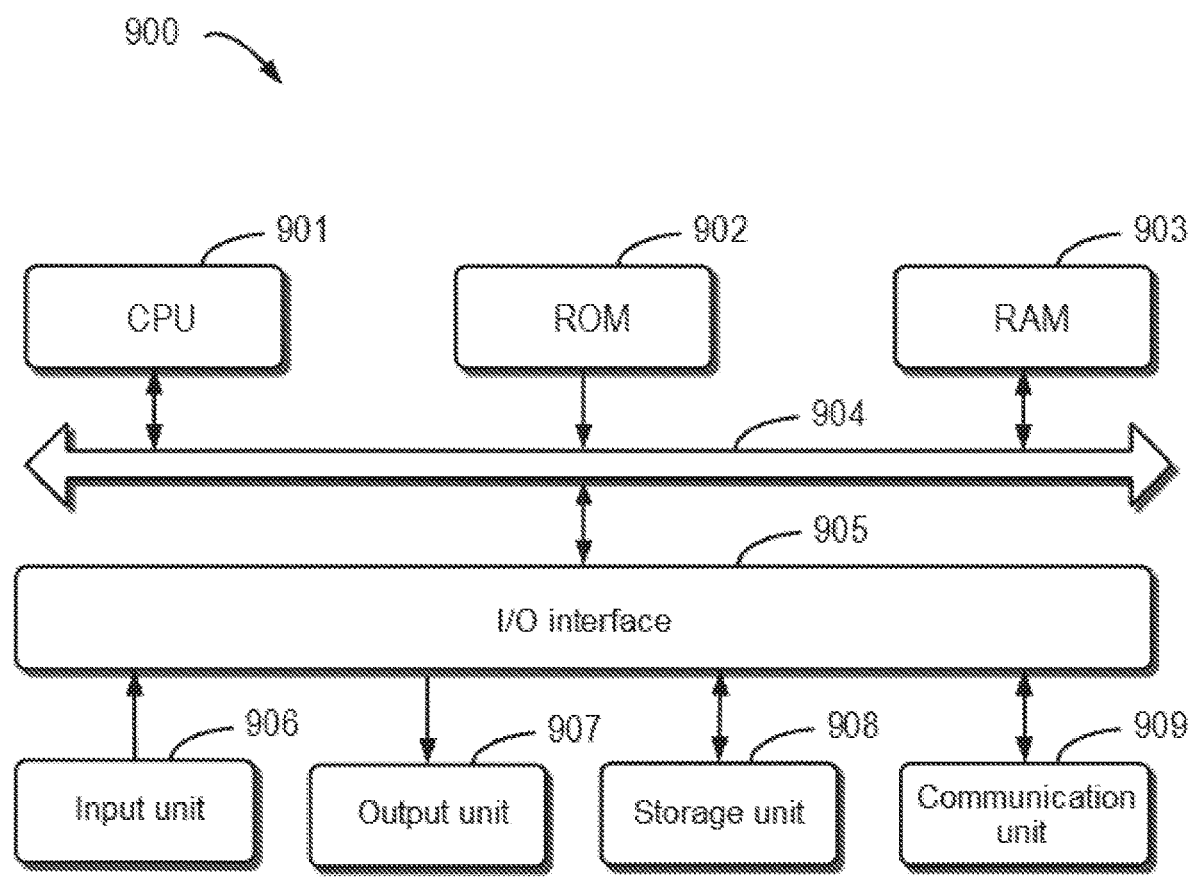
FIG. 9 schematically illustrates a block diagram of a device for managing indexes in a storage system according to an example implementation of the present disclosure.

FIG. 9 schematically illustrates a block diagram of device 900 for managing indexes in a storage system according to an example implementation of the present disclosure. As shown in the figure, device 900 includes general processing unit (CPU) 901 that may perform various appropriate actions and processing according to computer program instructions stored in read only memory (ROM) 902 or computer program instructions loaded from storage unit 908 to random access memory (RAM) 903. In RAM 903, various programs and data required for the operation of device 900 may also be stored. CPU 901, ROM 902, and RAM 903 are connected to each other through bus 904. Input/output (I/O) interface 905 is also connected to bus 904.

Multiple components in device 900 are connected to I/O interface 905, including: input unit 906, such as a keyboard or a mouse; output unit 907, such as various types of displays or speakers; storage unit 908, such as a magnetic disk or an optical disk; and communication unit 909, such as a network card, a modem, or a wireless communication transceiver. Communication unit 909 allows device 900 to exchange information/data with other devices over a computer network such as the Internet and/or various telecommunication networks.

The various processes and processing described above, such as method 300, may be performed by processing unit 901. For example, in some implementations, method 300 may be implemented as a computer software program that is tangibly included in a machine-readable medium, such as storage unit 908. In some implementations, some or all of the computer program may be loaded and/or installed onto device 900 via ROM 902 and/or communication unit 909. One or more steps of method 300 described above may be performed when the computer program is loaded into RAM 903 and executed by CPU 901. Alternatively, in other implementations, CPU 901 may also be configured to implement the above-described process/method in any other suitable manner.

According to an example implementation of the present disclosure, an electronic device is provided. The electronic device includes: at least one processor; and a memory coupled to the at least one processor. The memory has instructions stored therein. When executed by the at least one processor, the instructions cause the device to execute actions for managing indexes in a storage system. The storage system includes storage data. The actions include: acquiring a first set of data objects associated with the storage data; determining a first set of hashes of the first set of data objects respectively, hashes in the first set of hashes being hashes of data objects in the first set of data objects; generating a first file in the storage system to store the first set of hashes, a first name of the first file being determined based on the hashes in the first set of hashes; and creating an index of the storage data based on the first file.

According to an example implementation of the present disclosure, the actions further include: setting a type of the first file as an index type.

According to an example implementation of the present disclosure, the storage data includes multiple data blocks, and acquiring the first set of data objects associated with the storage data includes: acquiring at least a portion of the multiple data blocks as the first set of data objects.

According to an example implementation of the present disclosure, generating the first file in the storage system to store the first set of hashes includes: combining the first set of hashes according to a predetermined combination rule to generate content of the first file; storing the first file's content into the first file; and setting a hash of the first file's content as the first name of the first file.

According to an example implementation of the present disclosure, the actions further include: acquiring a second set of data objects associated with the storage data; determining a second set of hashes of the second set of data objects respectively; generating a second file in the storage system to store the second set of hashes, a second name of the second file being determined based on the hashes in the second set of hashes; and creating the index of the storage data based on the first file and the second file.

According to an example implementation of the present disclosure, creating the index of the storage data based on the first file and the second file includes: generating a third file in the storage system to store hashes of the first name and the second name; and identifying the third file as a parent node of the first file and the second file in the index.

According to an example implementation of the present disclosure, generating the third file in the storage system to store the hashes of the first name and the second name includes: combining the first name and the second name according to a predetermined combination rule to generate content of the third file; storing the third file's content into the third file; and using a hash of the third file's content as a name of the third file.

According to an example implementation of the present disclosure, the actions further include: identifying the third file as the first file to perform the method iteratively until the third file involves all data blocks in the storage data; and identifying the third file as a root file of the index of the storage data.

According to an example implementation of the present disclosure, the actions further include: reading file content of the root file according to a received access request for accessing the storage data; determining a set of file names of a set of child nodes of the root file respectively according to the file content; and accessing the storage data based on the set of file names.

According to an example implementation of the present disclosure, determining the set of file names of the set of child nodes of the root file respectively according to the file content includes: determining the set of file names of the set of child nodes of the root file respectively according to the predetermined combination rule.

According to an example implementation of the present disclosure, accessing the storage data based on the set of file names includes: for a given file name in the set of file names, accessing a given file having the given file name; determining a set of child file names of a set of child nodes of the given file respectively according to a determination that a type of the given file is an index type and based on file content of the given file; and accessing the storage data based on the set of child file names.

According to an example implementation of the present disclosure, the actions further include: accessing file content of the given file according to a determination that a type of the given file is a data type, the file content including one of the multiple data blocks of the storage data.

According to an example implementation of the present disclosure, the actions further include: traversing all child nodes of the root file to access all of the data blocks of the storage data.

According to an example implementation of the present disclosure, the actions further include: determining, based on a file related to the storage data, a path identifier associated with the file; and storing the file into a storage space having the path identifier in a remote storage system.

According to an example implementation of the present disclosure, the actions further include: retrieving the file from the storage space having the path identifier in the remote storage system.

According to an example implementation of the present disclosure, a computer program product is provided. The computer program product is tangibly stored on a non-transitory computer-readable medium and includes machine-executable instructions for performing the method according to the present disclosure.

According to an example implementation of the present disclosure, a computer-readable medium is provided. The computer-readable medium stores machine-executable instructions that, when executed by at least one processor, cause the at least one processor to implement the method according to the present disclosure.

The present disclosure may be a method, a device, a system, and/or a computer program product. The computer program product may include a computer-readable storage medium having computer-readable program instructions for performing various aspects of the present disclosure loaded thereon.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, an RAM, an ROM, an erasable programmable read only memory (EPROM or flash memory), a static random access memory (SRAM), a portable compact disk read only memory (CD-ROM), a digital versatile disk (DVD), a memory stick, a floppy disk, a mechanical encoding device such as a punch card or a protruding structure within a groove having instructions stored thereon, and any suitable combination of the foregoing. The computer-readable storage medium as used herein is not to be interpreted as transient signals per se, such as radio waves or other freely propagated electromagnetic waves, electromagnetic waves propagated through waveguides or other transmission media (e.g., light pulses through fiber-optic cables), or electrical signals transmitted through electrical wires.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, fiber optic transmission, wireless transmission, routers, firewalls, switches, gateway computers, and/or edge servers. A network adapter card or network interface in each computing/processing device receives a computer-readable program instruction from a network and forwards the computer-readable program instruction for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages such as Smalltalk, C++, etc., as well as conventional procedural programming languages such as the "C" language or similar programming languages. The computer-readable program instructions can be executed completely on a user's computer, executed partially executed on a user's computer, executed as a separate software package, executed partially on a user's computer and partially on a remote computer, or executed completely on a remote computer or a server. In the case where a remote computer is involved, the remote computer may be connected to a user's computer through any type of networks, including an LAN or a WAN, or may be connected to an external computer (e.g., connected through the Internet by using an Internet service provider). In some implementations, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described herein with reference to flowcharts and/or block diagrams of the method, the apparatus (system), and the computer program product according to the implementations of the present disclosure. It should be understood that each block in the flowcharts and/or the block diagrams and combinations of the blocks in the flowcharts and/or the block diagrams may be implemented by the computer-readable program instructions.

The computer-readable program instructions may be provided to a processing unit of a general-purpose computer, a special-purpose computer, or other programmable data processing apparatuses, thereby producing a machine, such that when these instructions are executed by the processing unit of the computer or other programmable data processing apparatuses, an apparatus for implementing functions/actions specified in one or more blocks in the flowcharts and/or the block diagrams is generated. The computer-readable program instructions may also be stored in the computer-readable storage medium. The instructions enable a computer, a programmable data processing apparatus, and/or other devices to operate in a specific manner, so that the computer-readable medium storing the instructions includes an article of manufacture that includes instructions for implementing various aspects of functions/actions specified in one or more blocks in the flowcharts and/or the block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process. Thus, the instructions executed on the computer, other programmable data processing apparatuses, or other devices implement the functions/actions specified in one or more blocks in the flowcharts and/or the block diagrams.

The flowcharts and block diagrams in the accompanying drawings illustrate architectures, functions, and operations of possible implementations of systems, methods, and computer program products according to multiple implementations of the present disclosure. In this regard, each block in the flowcharts or block diagrams can represent a module, a program segment, or a portion of an instruction that includes one or more executable instructions for implementing specified logical functions. In some alternative implementations, functions labeled in the blocks may occur in an order different from that labeled in the accompanying drawings. For example, two successive blocks may actually be performed basically in parallel, or they may be performed in an opposite order sometimes, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various implementations of the present disclosure have been described above, and the foregoing description is illustrative rather than exhaustive and is not limited to the disclosed various implementations. Multiple modifications and variations will be apparent to those of ordinary skill in the art without departing from the scope and spirit of the illustrated various implementations. The selection of terms used herein is intended to best explain the principles and practical applications of the various implementations or the improvements to technologies on the market, or to enable other persons of ordinary skill in the art to understand the implementations disclosed here.

The invention claimed is:

1. A method for managing indexes in a storage system, the storage system comprising storage data, the method comprising:
    acquiring a first set of data objects associated with the storage data;
    determining a first set of hashes of the first set of data objects, wherein hashes in the first set of hashes being hashes of data objects in the first set of data objects;
    generating a first file in the storage system to store the first set of hashes, a first name of the first file being determined based on the hashes in the first set of hashes;
    acquiring a second set of data objects associated with the storage data;
    determining a second set of hashes of the second set of data objects;
    generating a second file in the storage system to store the second set of hashes, a second name of the second file being determined based on hashes in the second set of hashes;
    creating an index of the storage data based on the first file and the second file, wherein creating the index of the storage data comprises:
        generating a third file in the storage system to store hashes of the first name and the second name; and
        identifying the third file as a parent node of the first file and the second file in the index.

2. The method according to claim 1, further comprising: setting a type of the first file as an index type.

3. The method according to claim 2, wherein the storage data comprises multiple data blocks, and acquiring the first set of data objects associated with the storage data comprises:
    acquiring at least a portion of the multiple data blocks as the first set of data objects.

4. The method according to claim 3, wherein generating the first file in the storage system to store the first set of hashes comprises:

combining the first set of hashes according to a predetermined combination rule to generate content;
storing the content into the first file; and
setting a hash of the content as the first name of the first file.

5. The method according to claim 1, wherein generating the third file in the storage system to store hashes of the first name and the second name comprises:
combining the first name and the second name according to a predetermined combination rule to generate content;
storing the content into the third file; and
using a hash of the content as a name of the third file.

6. The method according to claim 1, further comprising:
identifying the third file as the first file to perform the method iteratively until the third file involves all data blocks in the storage data; and
identifying the third file as a root file of the index of the storage data.

7. The method according to claim 6, further comprising:
reading content of the root file according to a received access request for accessing the storage data;
determining a set of file names of a set of child nodes of the root file using the content of the root file; and
accessing the storage data based on the set of file names.

8. The method according to claim 7, wherein determining the set of file names of the set of child nodes of the root file according to the content of the root file comprises:
determining the set of file names of the set of child nodes of the root file according to a predetermined combination rule.

9. The method according to claim 7, wherein accessing the storage data based on the set of file names comprises:
for a given file name in the set of file names:
accessing a given file having the given file name;
determining a set of child file names of a set of child nodes of the given file according to a determination that a type of the given file is an index type and based on file content of the given file; and
accessing the storage data based on the set of child file names.

10. The method according to claim 9, further comprising:
accessing the file content of the given file according to a determination that a type of the given file is a data type, the file content comprising a data block of the storage data.

11. The method according to claim 10, further comprising:
traversing all child nodes of the root file to access all of data blocks of the storage data.

12. The method according to claim 6, further comprising:
determining, based on a file related to the storage data, a path identifier associated with the file; and
storing the file into a storage space having the path identifier in a remote storage system.

13. The method according to claim 12, further comprising:
retrieving the file from the storage space having the path identifier in the remote storage system.

14. An electronic device, comprising:
at least one processor; and
a memory coupled to the at least one processor, the memory having instructions stored therein, wherein when executed by the at least one processor, the instructions cause the electronic device to perform a method for managing indexes in a storage system, the method comprising:
acquiring a first set of data objects associated with storage data in the storage system;
determining a first set of hashes of the first set of data objects, wherein hashes in the first set of hashes being hashes of data objects in the first set of data objects;
generating a first file in the storage system to store the first set of hashes, a first name of the first file being determined based on the hashes in the first set of hashes;
acquiring a second set of data objects associated with the storage data;
determining a second set of hashes of the second set of data objects;
generating a second file in the storage system to store the second set of hashes, a second name of the second file being determined based on hashes in the second set of hashes;
creating an index of the storage data based on the first file and the second file,
wherein creating the index of the storage data comprises:
generating a third file in the storage system to store hashes of the first name and the second name; and
identifying the third file as a parent node of the first file and the second file in the index.

15. A computer program product tangibly stored on a non-transitory computer-readable medium and comprising machine-executable instructions, wherein the machine-executable instructions are used to perform a method, the method comprising:
acquiring a first set of data objects associated with storage data in a storage system;
determining a first set of hashes of the first set of data objects respectively, wherein hashes in the first set of hashes being hashes of data objects in the first set of data objects;
generating a first file in the storage system to store the first set of hashes, a first name of the first file being determined based on the hashes in the first set of hashes, wherein generating the first file in the storage system to store the first set of hashes comprises:
acquiring a second set of data objects associated with the storage data;
determining a second set of hashes of the second set of data objects;
generating a second file in the storage system to store the second set of hashes, a second name of the second file being determined based on hashes in the second set of hashes;
creating an index of the storage data based on the first file and the second file,
wherein creating the index of the storage data comprises:
generating a third file in the storage system to store hashes of the first name and the second name; and
identifying the third file as a parent node of the first file and the second file in the index.

16. The computer program product of claim 15, the method further comprising:
setting a type of the first file as an index type,
wherein the storage data comprises multiple data blocks, and acquiring the first set of data objects associated with the storage data comprises: acquiring at least a portion of the multiple data blocks as the first set of data objects.

17. The computer program product of claim 16, wherein generating the first file in the storage system to store the first set of hashes comprises:
- combining the first set of hashes according to a predetermined combination rule to generate content;
- storing the content into the first file; and
- setting a hash of the content as the first name of the first file.

* * * * *